United States Patent [19]

Desprez

[11] Patent Number: 5,318,386

[45] Date of Patent: Jun. 7, 1994

[54] MANEUVERING MECHANISMS FOR MARINE PLATFORMS, METHOD FOR MANAGING THESE MECHANISMS AND INSTALLATION FOR IMPLEMENTING THE METHOD

[75] Inventor: François Desprez, Thouare sur Loire, France

[73] Assignee: Brissonneau et Lotz Marine, Carquefou, France

[21] Appl. No.: 915,988

[22] PCT Filed: Feb. 12, 1991

[86] PCT No.: PCT/FR91/00111

§ 371 Date: Aug. 3, 1992

§ 102(e) Date: Aug. 3, 1992

[87] PCT Pub. No.: WO91/12377

PCT Pub. Date: Aug. 22, 1991

[30] Foreign Application Priority Data

Feb. 13, 1990 [FR] France ................................. 90 01931

[51] Int. Cl.$^5$ ............................................. E02B 17/08
[52] U.S. Cl. ................................... 405/196; 405/199; 405/203
[58] Field of Search ..................... 73/862.321, 862.325; 340/665; 411/1, 8, 14, 916; 74/412 TA; 405/195.1, 196, 198, 199, 203, 205

[56] References Cited

U.S. PATENT DOCUMENTS

| 1,125,766 | 1/1915 | Thompson | 73/862.325 |
| 2,995,033 | 8/1961 | Stifano | 411/14 X |
| 3,060,731 | 10/1962 | Adise | 411/14 X |
| 3,911,736 | 10/1975 | Miller | 73/862.321 X |
| 4,587,854 | 5/1986 | Fry | 73/862.31 |
| 4,813,814 | 3/1989 | Shibuta et al. | 405/198 |
| 5,102,264 | 4/1992 | Thomas et al. | 405/198 |

FOREIGN PATENT DOCUMENTS

| 470454 | 1/1929 | Fed. Rep. of Germany | 73/862.325 |
| 80016 | 5/1983 | Japan | 405/198 |
| 2177978 | 2/1987 | United Kingdom . | |

Primary Examiner—Randolph A. Reese
Assistant Examiner—John Ricci
Attorney, Agent, or Firm—Sandler Greenblum & Bernstein

[57] ABSTRACT

An output gear is on an elongate sheath capable of withstanding torsion between its ends. The sheath is equipped with a device for measuring the torque borne by the gear. The device for measuring the torque comprises a bar which extends through the sheath, fixed to the sheath at one end and equipped at the other end with a lever in contact with at least one linear displacement sensor, preferably of the inductive coupling type. The sensor can supply data to a central unit for collecting all data gathered from each output gear. The central unit comprises a computer for determining a mean torque value, and optionally, the weight of the platform to be established, and a controller for automatically controlling the plurality of maneuvering mechanisms.

20 Claims, 2 Drawing Sheets

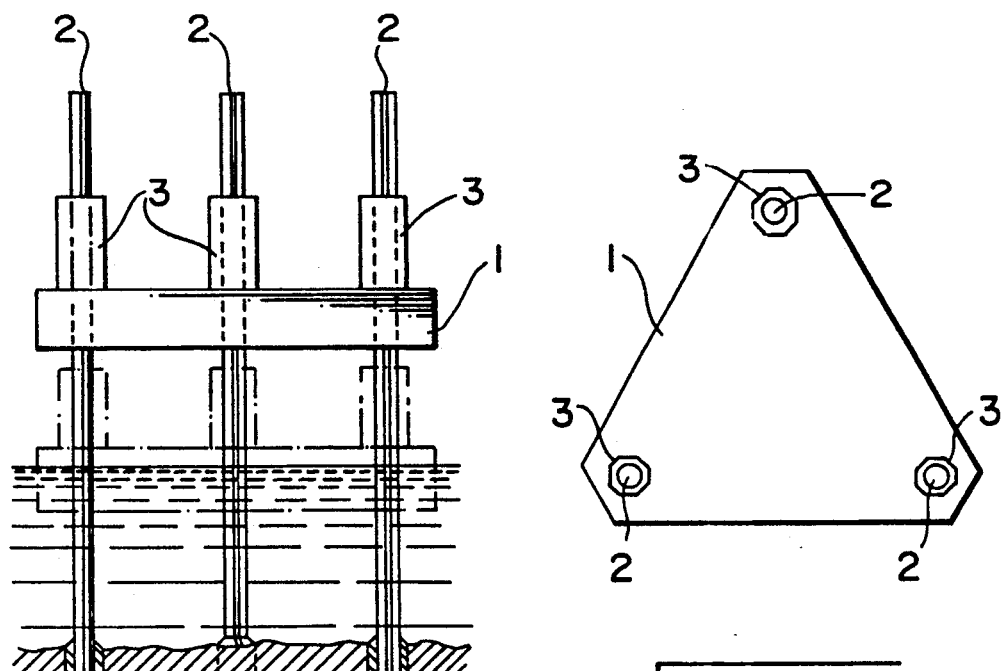
Fig_1   Fig_2
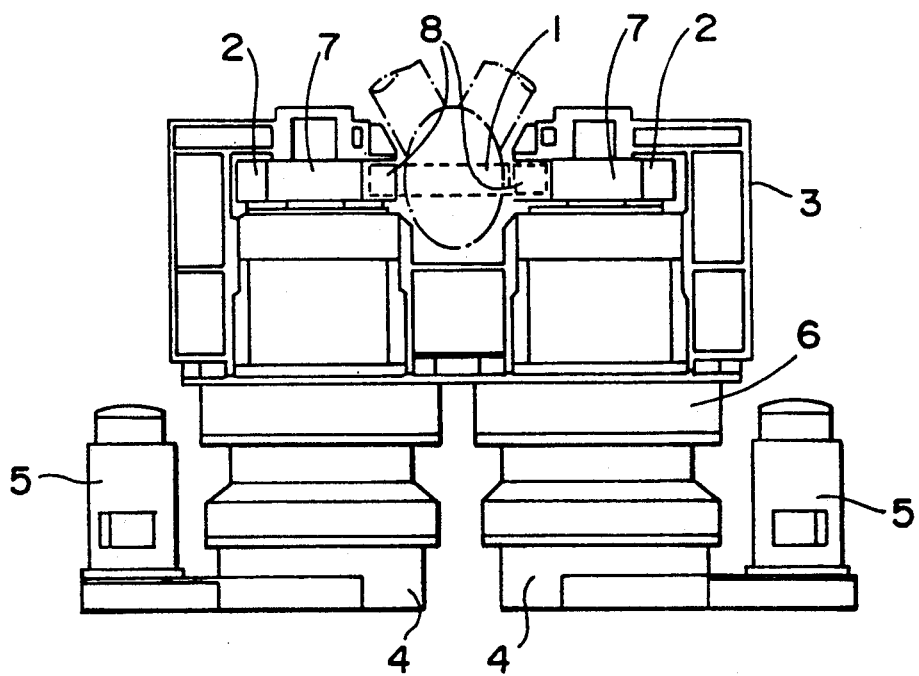
Fig_3

MANEUVERING MECHANISMS FOR MARINE PLATFORMS, METHOD FOR MANAGING THESE MECHANISMS AND INSTALLATION FOR IMPLEMENTING THE METHOD

BACKGROUND OF THE INVENTION

1. Field of the Invention

The present invention pertains to maneuvering mechanisms for platforms, and in particular to maneuvering mechanisms for marine platforms. The present invention also pertains to a method for controlling a plurality of maneuvering mechanisms and to an apparatus for implementing said method.

2. Background and Relevant Information

Marine platforms are generally used for offshore drilling operations, and are provided with a plurality of supporting jacketlegs which are submerged at a chosen site and which rest on the ocean bottom in order to maintain the platform above sea level.

Control over the marine platform is carried out by means of a plurality of mechanisms which make it possible to raise, lower, and maintain the platform on its jacketlegs. These mechanisms consist of a reduction gear, driven by motorized means in two directions of rotation in order to permit the required movements of the platform and/or the jacketlegs. The gear motor is connected to the structure of the platform by an intermediary framework.

The maneuvering mechanisms comprise an output gear which meshes on a rack on a supporting jacketleg.

On each jacketleg, there are preferably at least two racks associated with different raising mechanisms.

The output gear of the reduction motor, more particularly the teeth of the output gear, receive loads originating from the platform or from the jacketlegs, through the intermediary of the corresponding rack. The output gears frequently work at their elastic limit. Significant variations in forces can lead to a breakdown of teeth on the output gear. Variations in forces can originate from excessive frictional stresses, or from the stripping of the jacketlegs during maneuvering.

Maneuvering mechanisms are known which allow the load applied to each of the output gears to be detected, as described in U.S. Pat. No. 4,587,854. These maneuvering mechanisms comprise means for measuring the torque borne by the output gear. The means are arranged directly on this output gear, and are associated with means for transmitting the value of the torque applied to the output gear. The output gear of the maneuvering mechanism is of the shafted type. That is, the output gear comprises a sheath capable of withstanding torsion between its two ends. The downstream end of the sheath comprises the output gear. The upstream end of the sheath is linked to the reduction gear.

SUMMARY OF THE INVENTION

The present invention comprises a maneuvering mechanism for maneuvering a platform positioned on a plurality of jacketlegs having a rack thereon. The maneuvering mechanism comprises an output gear engaging the rack, and a sheath capable of withstanding torsion between an upstream end thereof and a downstream end thereof, with the downstream end of the sheath having the output gear thereon. The maneuvering mechanism further comprises an axial traversing bar connected to the sheath, and having an upstream end anchored on the upstream end of the sheath, and a free downstream end extending from the downstream end of the sheath. The maneuvering mechanism further comprises a measuring means for measuring torque borne by the output gear as a function of the displacement of the downstream end of the axial traversing bar relative to the downstream end of the sheath. The measuring means comprises a radial lever connected to the free end of the axial traversing bar, and a linear displacement sensor positioned between the sheath and the end of the radial lever.

The device of the present invention makes measurements in the central zone (e.g., axis) of the sheath, at the end of a bar which traverses the sheath through its entire length. The precision of these measurements can be relatively low, considering the extremely reduced amplitude of the sheath with respect to the bar, and considering the losses inherent in the means for transmitting the values detected by the measuring means.

An object of the present invention is to reduce the risk of breaking the teeth of the output gears of the maneuvering mechanisms, by effectively monitoring the torque forces exerted on the output gears, and to improve the precision of the platform-weighing operations, by reducing the percentage of uncertainty in the weighing operation.

A further object of the present invention is to improve the procedures for maneuvering marine platforms, and to reduce the time necessary for such maneuvering, as well as to improve the safety in the maneuvering of marine platforms.

According to a preferred embodiment of the present invention, the means for measuring the torque further comprises means for rotationally guiding the downstream end of the axial bar, this means being integral with the sheath.

According to a preferred arrangement of the invention, the means for rotationally guiding the downstream end of the axail bar comprises a pair of roller bearings arranged in a V (i.e., a V-shape) positioned (and/or affixed) on the downstream face of the sheath. In order to maintain the contact between the bar and the pair of roller bearings, the bar is preferably prestressed and slightly arched, in order to be applied, with a certain force, on the pair of roller bearings.

Accordingly to another preferred arrangement of the invention, the radial lever extends, on one side of the bar, over a length which is as long as possible, taking into account the configuration of construction. Preferably, the radial lever extends over about two thirds of the external radius of the sheath.

The invention also relates to a method for controlling the maneuvering mechanisms of marine platforms, during the operations of lifting, weighing, or otherwise maneuvering the platform. This method comprises the steps of: (1) collecting a plurality of torque measurements originating from the various maneuvering mechanisms; (2) establishing a mean torque value of the detected torque measurements; and (3) automatically controlling the plurality of maneuvering mechanisms, so that each output gear has a load substantially corresponding to the mean torque value.

The present invention also relates to a mechanism for maneuvering marine platforms mounted on jacketlegs, of the type described in Great Britain Application No. 2,177,978. However, the mechanism of the present invention further comprises: (1) a central unit for collecting torque measurements of the gears in engagement with a rack integral with each jacketleg; (2) a computer for determining a mean torque value and, optionally, the weight of the platform to be directly established; and (3) means for automatically controlling a plurality of maneuvering mechanisms by automatic actuation thereof, so that each output gear has a load substantially corresponding to said mean torque value.

BRIEF DESCRIPTION OF THE DRAWINGS

The above and additional objects, characteristics, and advantages of the present invention will become apparent in the following detailed description of the preferred embodiments, with reference to the accompanying drawings, which are presented as non-limiting examples of the present invention.

FIG. 1, illustrates, in elevation, a marine platform according to the invention in the normal working position and, in fine dot and dash lines, in the floating position.

FIG. 2, illustrates a view of the marine platform represented in FIG. 1, taken from above.

FIG. 3, illustrates the maneuvering means of the marine platform, viewed from above.

DETAILED DESCRIPTION OF THE INVENTION

Figure 4:
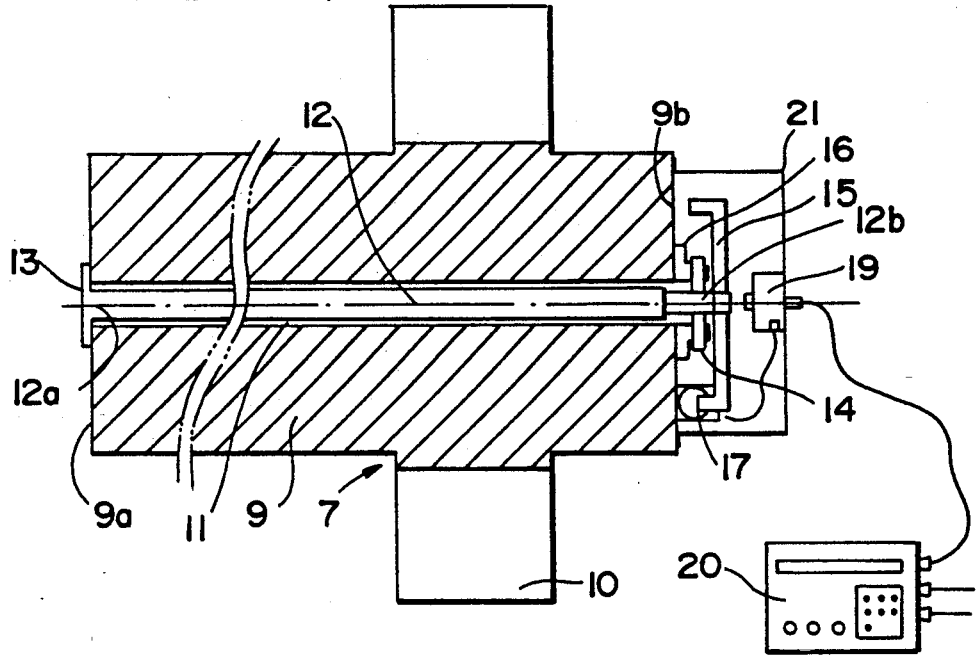
FIG. 4, illustrates an output gear of a maneuvering mechanism according to the invention.

FIG. 1 illustrates a platform 1 supported by three piers or jacketlegs 2 in the shape of cylindrical or oval tubes. In the normal working position, i.e., for drilling work, the platform 1 is positioned above sea level, and the jacketlegs are driven into the sea bed, stabilizing the platform. The fine dot and dash lines represent the platform floating on the water. In fact, when this type of platform is brought to the drilling site, towed by one or several tugs, the jacketlegs are in a totally retracted position. The jacketlegs are then maneuvered by the maneuvering mechanisms described in detail below. The jacketlegs are guided into the frameworks 3, which are securely fixed to the platform 1.

FIG. 2, illustrates, viewed from above, a platform of the triangular type, comprising three jacketlegs 2 guided into the frameworks 3.

FIG. 3 illustrates two maneuvering mechanisms 4 arranged in the framework 3. In a single framework 3, there may be several maneuvering mechanisms 4 acting on the same jacketleg.

The maneuvering mechanisms 4 consist of a motor 5 and a reduction gear 6 at the end of which is an output gear 7. Each output gear 7 meshes with a rack 8 integral with the jacketleg 2. As illustrated in FIG. 3, the jacketleg 2 comprises two racks 8, positioned opposite one another.

FIG. 4 represents the output gear 7 of the maneuvering mechanism 4. The output gear 7 has the shape of an elongate hollow shaft or sheath 9, a downstream end of which comprises teeth 10 which mesh with teeth positioned on a rack 8 (illustrated in FIG. 3), and an upstream end of which comprises a means (not illustrated) for linking the output gear 7 with a reduction gear 6.

The sheath 9 comprises an internal cavity 11 which, in the embodiment illustrated in FIG. 4, extends through the sheath, along the longitudinal axis of the sheath. This internal cavity 11 encloses an axial traversing bar 12 in the shape of a cylindrical rod, an upstream end 12a of which is immobilized on the upstream end 9a of the sheath, by means of a flange 13. A downstream end 12b of the axial traversing bar 12 is preferably supported and rotationally guided by means of a pair of roller bearings 14. The roller bearings 14 are supported by the downstream end 9b of the sheath 9. Further downstream of roller bearings 14, the bar comprises a radial lever 15 which extends radially over a length a corresponding to about two thirds of the external radius of the sheath 9, so as to amplify the movement of the radial lever with respect to the sheath and, thus, to improve the precision in measuring the torque exerted on the output gear.

The axial traversing bar 12 is centered through the longitudinal axis of the sheath 9 having the output gear 7 thereon. The length of the axial traversing bar, in the example of FIG. 4, is substantially greater than the axial length of the sheath 9.

The support of the axial traversing bar 12 comprises a pair of roller bearings 14 which form a supporting "V" (i.e., V-shape). The two roller bearings 14 are fixed by means of skids 16 on a face of the downstream end 9b of the sheath 9. The contact points are angularly offset along the circumference of the axial traversing bar 12, preferably by an angle of about 90°.

The axial traversing bar 12 is applied with a certain force into this "V", by an initial predeformation. Before installation, the axial traversing bar 12 is preferably prestressed, and slightly arched. Such an arrangement of the axial traversing bar in the sheath has the advantage of being able to support an axial displacement of the bar, especially in the event of expansion. This arrangement further provides the advantage of eliminating parasitic frictional forces of the bar, which are capable of hindering its rotational movement. The measuring precision is distinctly improved by a total absence of play in the guiding of the axial traversing bar 12, i.e. between the axial traversing bar and the pair of roller bearings.

Moreover, the balance of the axial traversing bar is important in order to avoid a cyclic torsion during the rotation of the output gear. The radial lever 15 extends radially on either side of the axial traversing bar in order to provide balance to the bar.

Figure 5:
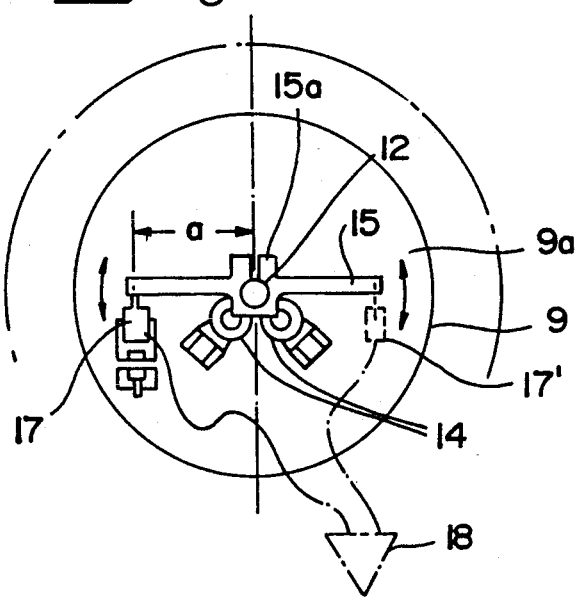
FIG. 5, illustrates, viewed from the front, the torque measuring system, installed at the end of the output gear.
Figure 6:
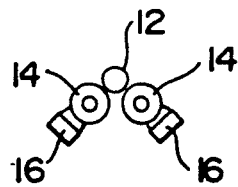
FIG. 6, illustrates a detailed view of a system for guiding an element of the torque measuring system.

FIG. 5 illustrates the radial lever 15 fitted by pinching the downstream end 12b of the axial traversing bar 12, by means of lugs 15a, in order to facilitate initial positioning and adjustment of the radial lever. At one end of the radial lever 15, there is a measurement means enabling measurement of the amount of displacement of the radial lever with respect to the sheath 9. This measurement means comprises a linear displacement measuring sensor 17. The linear displacement measuring sensor 17 is preferably of the inductive coupling type. The linear displacement measuring sensor is preferably integral, preferably in an adjustable fashion, with the downstream end 9b of the sheath 9.

Providing a symmetrical design to the radial lever 15 allows, as illustrated in fine dot and dash lines of FIG. 5, an optional arrangement comprising a second linear displacement measuring sensor 17, which is also positioned on the downstream end 9b of the sheath 9. This second sensor 17' enables the measuring precision to be further increased. In fact, the torque measurement is then free of variations in the source which is common to both sensors and, moreover, the torque measurement is free of all the movements of the radial lever other than torsion on the output gear. The sensors 17 and 17' are preferably connected to a differential amplifier 18 (illustrated schematically in FIG. 5).

In FIG. 4 the sensor 17, or the differential amplifier 18 (in the event of two sensors 17 and 17' are provided), is connected to a rotary collector 19, positioned on the downstream end of the output gear. The rotary collector 19 enables transmission of data from the sensor to a processing means 20, which collects a set of data originating from the plurality of maneuvering mechanisms 4 of the platform. The rotary collector 19 is fitted on a protective cap 21, which is attached to the face of the downstream end 9b of the sheath 9.

The operation of the torque measuring device of the present invention is as follows. When forces are exerted on the output gear 7, the sheath 9, due to its length (which preferably corresponds substantially to about four times its diameter) is the site of torsion between its two ends, and in particular between the teeth 10 and its upstream end 9a. The axial traversing bar 12, which is fixed at the upstream end 9a of the sheath, and which is free with respect to the downstream end 9b of the sheath transmits, by virtue of radial lever 15, the angular variation between the sheath ends 9a and 9b. This angular variation is measured in the form of a linear displacement of the sensor or sensors 17 and/or 17', which are subjected to the movement of the radial lever 15.

Data obtained by virtue of the sensor 17 and/or 17', relates to the amount of torque applied to the teeth 10 of each of the output gears 7 of the maneuvering mechanisms 4. This data is then centralized for managing the forces which are exerted in the area of each of the output gears. Thus, by simple calculations, a mean torque value (i.e. average torque value) of the torque forces applied to the plurality of output gears is established, and the maneuvering mechanisms can than be actuated so that the mean torque value has a substantially even distribution over each of the output gears. The determination of the mean torque value, on each of the mechanisms 4, also enables the weight of the platform to be determined with greater precision, and with a margin of error of less than 5%.

The device for controlling the plurality of maneuvering mechanisms comprises means for collecting a plurality of torque measurements for each output gear, said means preferably being a central unit. The device further comprises means for determining a mean torque value for each output gear, said means calculating the mean torque value to be applied to each output gear, and, optionally, for determining the weight of the platform. The device further comprises means for automatically controlling the plurality of maneuvering mechanisms 4 by automatic actuation, so that each output gear 7 has a load substantially corresponding to said mean torque value.

What is claimed is:

1. A maneuvering mechanism for maneuvering a platform on a plurality of jacketlegs having a rack thereon, comprising:
    an output gear for engaging the rack;
    a sheath capable of withstanding torsion between an upstream end thereof and a downstream end thereof, said downstream end of said sheath having said output gear thereon;
    an axial traversing bar connected to said sheath, said axial traversing bar having an upstream end anchored on said upstream end of said sheath, and a free downstream end extending from said downstream end of said sheath; and
    measuring means for measuring torque borne by said output gear as a function of the relative displacement of said downstream end of said axial traversing bar and said downstream end of said sheath, said measuring means comprising a radial lever connected to said free end of said axial traversing bar, and a linear displacement sensor between said sheath and an end of said radial lever.

2. The maneuvering mechanism according to claim 1, wherein said mechanism is on a marine platform.

3. The maneuvering mechanism according to claim 2, comprising means for rotationally guiding said downstream end of said axial traversing bar.

4. The maneuvering mechanism according to claim 4, wherein said means for rotationally guiding said downstream end of said axial traversing bar comprises a pair of roller bearings arranged in a V, said pair of bearings being on a face of said downstream end of said sheath.

5. The maneuvering mechanism according to claim 4, wherein said axial traversing bar is prestressed and slightly arched, so that said axial traversing bar can be applied with a certain force to said pair of roller bearings.

6. The maneuvering mechanism according to claim 5, wherein said radial lever extends, on one side of said axial traversing bar, for a length of about two thirds of an external radius of said sheath.

7. The maneuvering mechanism according to claim 6, wherein an inductive coupling sensor is interposed between said radial lever and said sheath.

8. The maneuvering mechanism according to claim 6, wherein two inductive coupling sensors, connected to a differential amplifier, are interposed between said radial lever and said sheath.

9. The maneuvering mechanism according to claim 8, a rotary collector, for transmitting data originating from at one sensor, is on said downstream end of said output gear.

10. The maneuvering mechanism according to claim 5, wherein a rotary collector, for transmitting data originating from at least one sensor, is on said downstream end of said output gear.

11. The maneuvering mechanism according to claim 1, wherein said radial lever extends, on one side of said axial traversing bar, for a length of about two thirds of an external radius of said sheath.

12. The maneuvering mechanism according to claim 1, wherein an inductive coupling sensor is interposed between said radial lever and said sheath.

13. The maneuvering mechanism according to claim 1, wherein two inductive coupling sensors, connected to a differential amplifier, are interposed between said radial lever and said sheath.

14. A method for controlling a plurality of maneuvering mechanism for maneuvering a platform, comprising a plurality of maneuvering mechanism on a plurality of jacketlegs having a rack thereon, each of said maneuvering mechanisms comprising at least one output gear engaging the rack, said mechanism further comprising:
    a sheath capable of withstanding torsion between an upstream end thereof and a downstream end thereof, said downstream end of said sheath having at least one output gear thereon;

an axial traversing bar connected to said sheath, said axial traversing bar having an upstream end anchored on said upstream end of said sheath, and a free downstream end extending from said downstream end of said sheath;

means for rotationally guiding said downstream end of said axial traversing bar comprising a pair of roller bearings arranged in a V, said pair of bearings being on a face of said downstream end of said sheath, said axial traversing bar is prestressed and slightly arched, so that said axial traversing bar can be applied with a certain force to said pair of roller bearings; and measuring means for measuring the torque borne by said at least one output gear as a function of the relative displacement of said downstream end of said axial traversing bar and said downstream end of said sheath, said measuring means comprising a radial lever connected to said free end of said axial traversing bar, and a linear displacement sensor between said sheath and an end of said radial lever;

said method comprising:

collecting torque measurement data for each output gear;

establishing a mean torque value to be applied to each output gear; and automatically actuating the maneuvering mechanisms, so that each output gear has a load corresponding to said mean torque value.

15. The method according to claim 14, wherein the platform is a marine platform.

16. The method according to claim 15, wherein:

said radial lever extends, on one side of said axial traversing bar, for a length of about two thirds of an external radius of said sheath;

two inductive coupling sensors, connected to a differential amplifier, are interposed between said radial lever and said sheath;

a rotary collector, for transmitting data originating from at least one sensor, on said downstream end of said output gear.

17. An apparatus for controlling a plurality of maneuvering mechanisms for maneuvering a platform, comprising:

an output gear for engaging a rack;

a sheath capable of withstanding torsion between an upstream end thereof and a downstream end thereof, said downstream end of said sheath having said output gear thereon;

an axial traversing bar connected to said sheath, said axial traversing bar having an upstream end anchored on said upstream end of said sheath, and a free downstream end extending from said downstream end of said sheath; and means for measuring torque borne by said output gear as a function of the relative displacement of said downstream end of said axial traversing bar and said downstream end of said sheath, said measuring means comprising a radial lever connected to said free end of said axial traversing bar, and a linear displacement sensor between said sheath and an end of said radial lever;

means for collecting a plurality of torque measurements;

means for calculating a mean torque value; and means for automatically controlling said plurality of maneuvering mechanisms.

18. The apparatus according to claim 17, further comprising means for determining the weight of the platform.

19. The apparatus according to claim 17, wherein the platform is a marine platform.

20. The apparatus according to claim 19, further comprising:

means for rotationally guiding said downstream end of said axial traversing bar comprising a pair of roller bearings arranged in a V, said pair of roller bearings being on a face of said downstream end of said sheath, said axial traversing bar is prestressed and slightly arched, so that said axial traversing bar can be applied with a certain force to said pair of roller bearings;

said means for collecting said plurality of torque measurements comprising means for collecting torque measurement data for each output gear;

said means for determining a mean torque value comprising means for calculating mean torque value to be applied to each output gear; and said means for automatically controlling said plurality of maneuvering mechanisms comprising means for automatic actuation of said maneuvering mechanisms, in order to provide each output gear with a torque load substantially corresponding to said mean torque value.

* * * * *